US012660732B1

(12) United States Patent
Leeman

(10) Patent No.: US 12,660,732 B1
(45) Date of Patent: Jun. 23, 2026

(54) INTEGRATED BOX BLADE STORAGE AND UTILITY ASSEMBLY

(71) Applicant: Rick Leeman, Novar (CA)

(72) Inventor: Rick Leeman, Novar (CA)

(73) Assignee: Rick Leeman, Novar (CA)

( * ) Notice: Subject to any disclaimer, the term of this patent is extended or adjusted under 35 U.S.C. 154(b) by 0 days.

(21) Appl. No.: 19/360,138

(22) Filed: Oct. 16, 2025

Related U.S. Application Data

(63) Continuation of application No. 19/310,942, filed on Aug. 27, 2025, now Pat. No. 12,532,797.

(51) Int. Cl.
B60R 19/48 (2006.01)
A01B 76/00 (2006.01)
A01B 35/14 (2006.01)

(52) U.S. Cl.
CPC .............. A01B 76/00 (2013.01); A01B 35/14 (2013.01)

(58) Field of Classification Search
CPC ... B60R 19/48; B60R 11/06; B60R 2011/004; B60R 9/00; B60R 9/06; A01B 76/00; A01B 35/14; A01B 59/06; A01B 59/002; A01B 59/042
USPC ........................................................ 224/410
See application file for complete search history.

(56) References Cited

U.S. PATENT DOCUMENTS

| | | | | |
|---|---|---|---|---|
| 7,644,846 | B2 * | 1/2010 | Hafendorfer | B60P 3/14 |
| | | | | 248/316.4 |
| 9,533,623 | B2 * | 1/2017 | Descoteaux | B62B 3/02 |
| 2016/0324063 | A1 * | 11/2016 | Shaw | B60R 9/06 |
| 2024/0399966 | A1 * | 12/2024 | Engandala | B60R 9/00 |
| 2025/0115085 | A1 * | 4/2025 | Harrop, Jr. | B60D 1/065 |

FOREIGN PATENT DOCUMENTS

WO     WO-2007039704 A1 *   4/2007   ............. B60K 25/06

* cited by examiner

*Primary Examiner* — Adam J Waggenspack
(74) *Attorney, Agent, or Firm* — Jordan Sworen; Daniel Enea; Argus Intellectual Enterprise, LLC

(57) ABSTRACT

An integrated box blade storage and utility assembly is provided. The assembly combines a box blade implement and a storage container into a single unitary structure. The device includes internal storage compartments for tools, external utility posts for carrying auxiliary equipment, a hitch ball for towing operations, and a permanently attached chainsaw shelf and vise for on-site tool maintenance. The integrated configuration also functions as ballast for the tractor, eliminating the need for a separate ballast box. The assembly provides a compact, multi-purpose solution that enhances field productivity, safety, and convenience for tractor operators.

15 Claims, 4 Drawing Sheets

INTEGRATED BOX BLADE STORAGE AND UTILITY ASSEMBLY

CROSS REFERENCE TO RELATED APPLICATION

This application claims the benefit of pending U.S. Non-provisional application Ser. No. 19/310,942 filed on Aug. 27, 2025; the above identified patent application is herein incorporated by reference in its entirety.

BACKGROUND OF THE INVENTION

The present invention relates generally to tractor-mounted implements. More specifically, the present invention pertains to a combined box blade and equipment storage assembly, enabling organized, accessible, and secure transport of tools and supplies during field operations.

Tractors are commonly employed across a wide range of industries for grading, leveling, and hauling materials. Among the most widely used rear implements for such purposes is the box blade. A conventional box blade includes a forward cutting edge, side walls, and a set of scarifier shanks used to loosen, spread, or level soil and gravel. While highly effective for grading, traditional box blades serve a single function and provide no built-in capacity for carrying tools, supplies, or other essential equipment. As a result, operators must transport fuel cans, chainsaws, safety cones, and hand tools separately, either in the front loader bucket, on an attached trailer, or inside the tractor cab. This not only reduces available workspace but also increases the risk of tools shifting, falling, or becoming damaged during operation.

Various products have been developed to address the lack of onboard storage for tractors, including tool caddies and accessory carriers that attach to a tractor's three-point hitch. However, these devices typically occupy the same hitch location required for the box blade, ballast box, or other implements. This means an operator must repeatedly remove and replace attachments depending on the task at hand, wasting valuable time and effort. In addition, most caddy systems are heavy, expensive, and require complex mounting hardware, making them impractical for quick deployment. Because they are often positioned behind or above the implement, accessibility can also be poor, forcing the operator to dismount or reach awkwardly to retrieve stored items.

Some attempts have been made to provide storage on or near the tractor itself, such as by mounting small toolboxes or racks onto the Roll Over Protection Structure (ROPS). These systems are typically positioned at head height or higher, creating safety hazards when the tractor passes beneath low-clearance areas. Moreover, such systems are limited in capacity and cannot safely accommodate larger tools or fluids. They also offer no functional benefits beyond storage and do not contribute to tractor balance or implement performance.

Another challenge for tractor operators is the need for ballast weight when using a front-end loader. Ballast boxes are commonly used for this purpose, filled with dense material such as sand or concrete to counterbalance the weight of a front-mounted load. However, ballast boxes provide no practical function other than adding weight. They must be attached and removed separately whenever an operator needs to switch to a grading or towing implement, resulting in additional time and equipment handling. This redundancy increases operational costs and complicates workflow, especially for smaller operations that cannot maintain multiple implements for separate functions.

Field maintenance is another persistent problem that existing solutions fail to address. Operators who use chainsaws or other portable cutting tools frequently need to refuel, re-oil, or sharpen blades while working in remote areas. Traditional box blades and storage systems do not include any stable work surfaces or mounting points for performing such maintenance safely. Operators are often forced to balance their chainsaws on uneven ground or on the tractor's rear attachment, posing risks of slippage and injury. There is no known implement that provides an integrated workbench or vise feature designed specifically for safe and convenient field tool servicing.

Towing is an additional area where conventional designs fall short. While some tractors include a fixed hitch ball on the rear frame, these hitches do not allow the operator to adjust the towing height. When a trailer is attached to a fixed ball, the tongue may not align level with the ground, especially on uneven terrain. This creates difficulty when loading or unloading materials, as the trailer bed cannot be tilted to the desired angle. Adjusting the towing height would normally require manual repositioning or additional hardware, neither of which is efficient or safe during field operations.

There is therefore a need for a multi-functional implement that integrates storage, grading, towing, and maintenance capabilities in a single compact structure, eliminating the need for multiple attachments. Such an implement should provide secure, easily accessible compartments for tools and supplies; an adjustable hitch mechanism for towing trailers; a work surface and vise for field tool servicing; and inherent ballast weight for improved tractor stability.

In light of the devices disclosed in the known art, it is submitted that the present invention substantially diverges in design elements and methods from the known art and consequently it is clear that there is a need in the art for an integrated box blade storage and utility assembly. In this regard the instant invention substantially fulfills these needs.

SUMMARY OF THE INVENTION

In view of the foregoing disadvantages inherent in the known types of box blades now present in the known art, the present invention provides a new integrated box blade storage and utility assembly for providing convenient and secure access to tools and equipment during field operations, eliminating the need for separate storage or transportation arrangements and increasing efficiency for tractor operators.

It is an objective of the present invention to provide an integrated box blade storage and utility assembly comprising a storage container with multiple internal compartments, allowing users to organize and transport essential gear without occupying the tractor's front loader or cab. This configuration eliminates the need for repeated trips to retrieve equipment, thereby improving field efficiency and operator workflow.

It is an objective of the present invention to provide an integrated box blade storage and utility assembly that comprises a forward-facing box blade section with grading and scarifying elements, and an upper storage portion defining multiple compartments for retaining tools, fluids, and accessories.

It is an objective of the present invention to provide an integrated box blade storage and utility assembly comprising a pair of vertical utility posts are provided at opposite ends of the assembly, allowing an operator to carry items such as buckets, hazard cones, or long-handled tools. These posts include securing fasteners for stability during operation.

It is an objective of the present invention to provide an integrated box blade storage and utility assembly having a central mounted hitch ball on the rear portion of the assembly. This feature enables the operator to raise or lower a connected trailer tongue via the tractor's hydraulic lift, facilitating easier loading and unloading of materials.

It is an objective of the present invention to provide an integrated box blade storage and utility assembly comprising a side-mounted shelf with a permanently affixed vise for chainsaw maintenance. This feature allows field sharpening and servicing of saws, supported by the conveniently located storage compartments containing bar oil, fuel, and other supplies. The vise and shelf are positioned to maintain visibility and accessibility during grading operations.

It is an objective of the present invention to provide an integrated box blade storage and utility assembly configured to provide a substantial mass, it also functions as an effective ballast for the tractor. This dual-purpose capability reduces the need for a separate ballast box, offering both cost savings and operational efficiency to manufacturers and users.

It is therefore an object of the present invention to provide a new and improved equipment storage device for a box blade that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
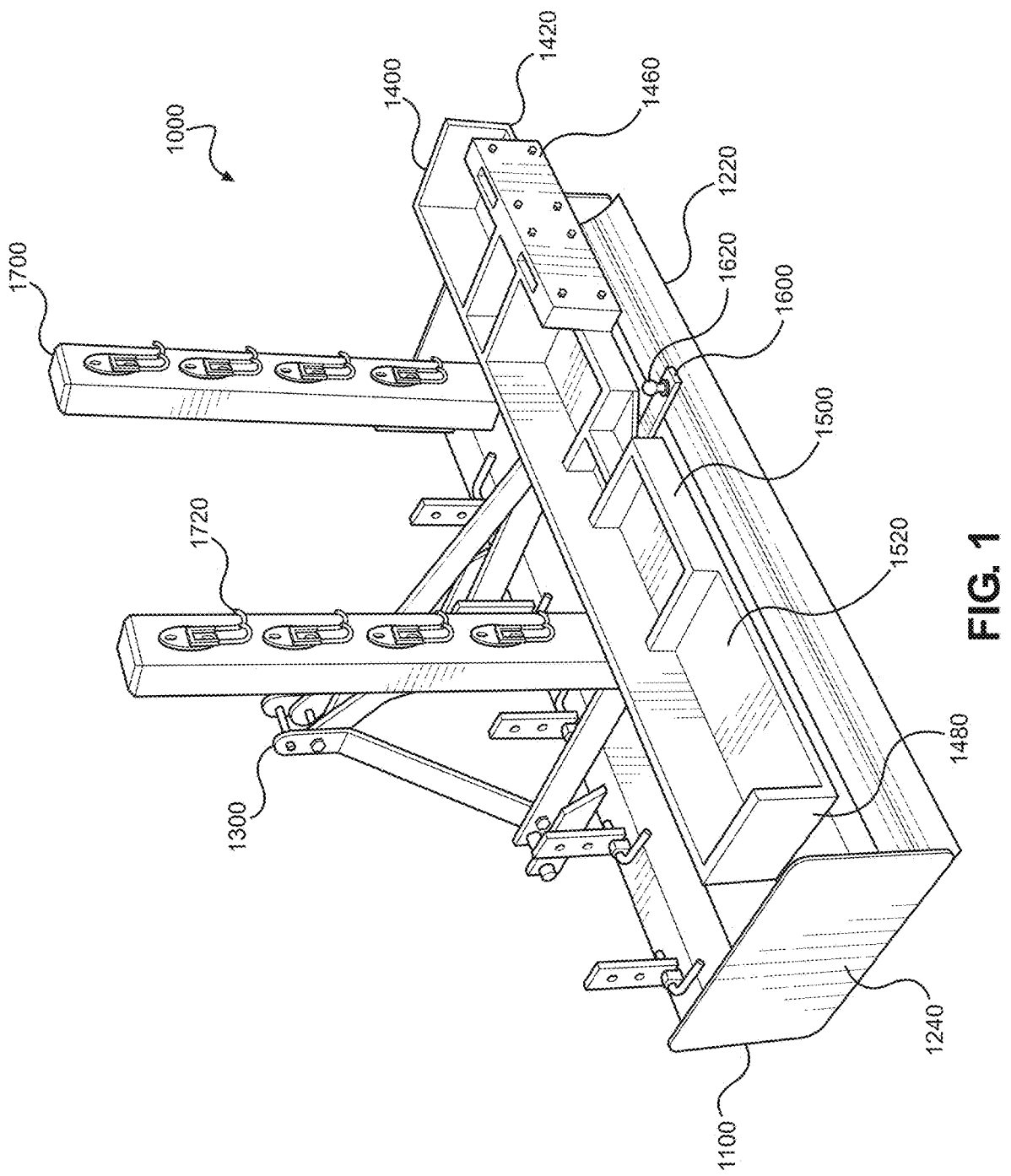
FIG. 1 shows a perspective view of an embodiment of the integrated box blade storage and utility assembly.

Reference is made herein to the attached drawings. Like reference numerals are used throughout the drawings to depict like or similar elements of the system. For the purpose of presenting a brief and clear description of the present invention, the embodiment discussed will be used for providing an integrated box blade storage and utility assembly enabling convenient and secure transportation of tools and equipment during field operations. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment," "second embodiment," or "third embodiment" does not necessarily refer to the same embodiment.

Figure 2:
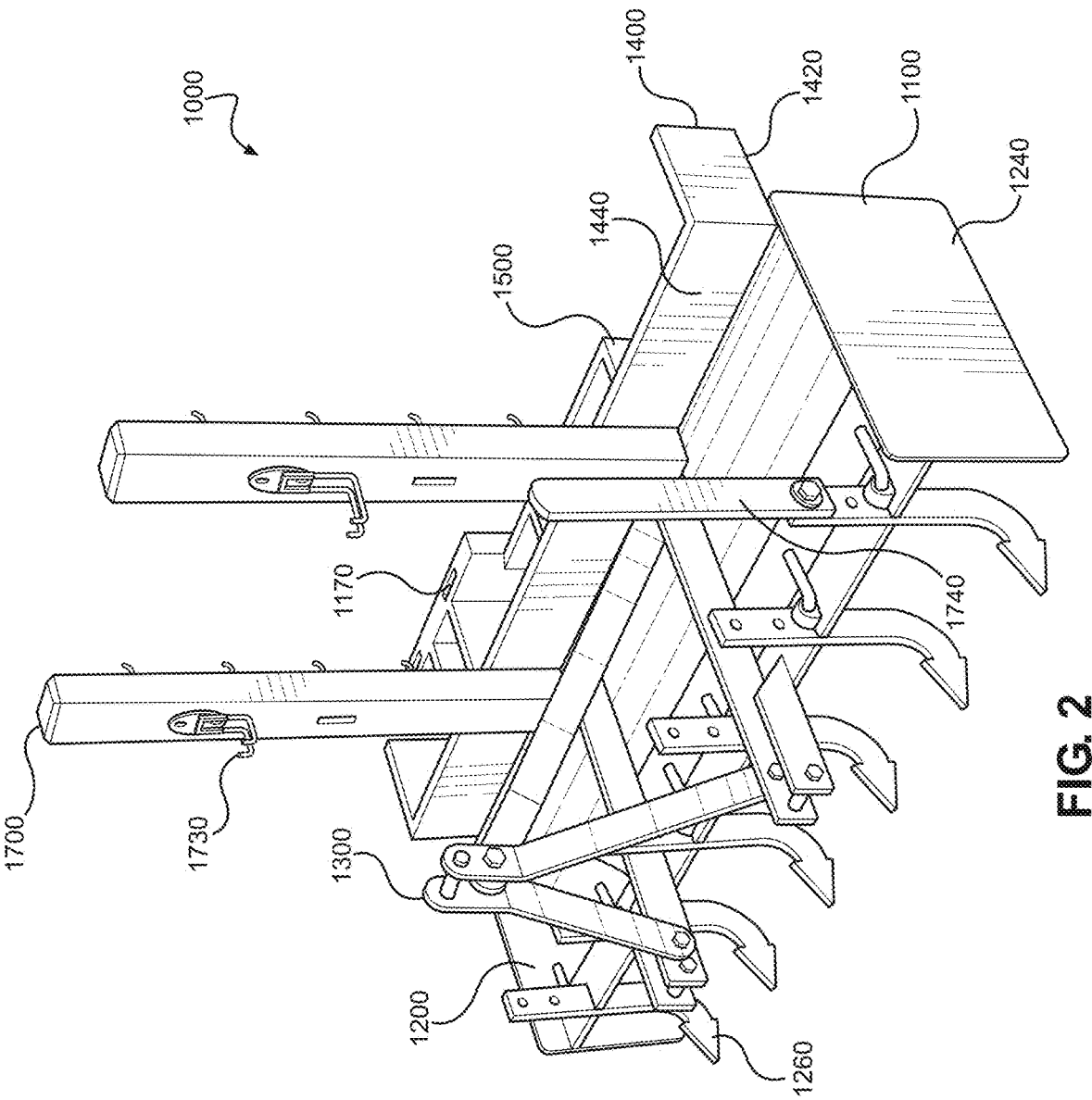
FIG. 2 shows a rear perspective view of an embodiment of the integrated box blade storage and utility assembly.

Referring now to FIGS. 1 and 2, there is shown a perspective view and a rear perspective view of an embodiment of the integrated box blade storage and utility assembly, respectively. The integrated box blade storage and utility assembly 1000 includes a main body 1100 formed as a unitary structure. The body 1100 comprises a forward box blade section 1200 with a cutting edge 1220, side plates 1240, and scarifier shanks 1260, operatively connected to a standard three-point hitch 1300 for attachment to a tractor.

In the shown embodiment, the scarifier shanks 1260 are elongated, vertically oriented elements configured to penetrate and break compacted soil or aggregate material positioned beneath the cutting edge 1220. Each scarifier shank 1260 includes a lower tip or tooth formed from hardened steel and an upper portion that is adjustably retained within a receiving element mounted to a crossbeam of the box blade section 1200. The receiving element comprises an aperture or slot adapted to receive the shank and secure it at various depths via removable pins or clamps, allowing selective adjustment of penetration depth according to the working conditions.

An upper storage housing 1400 is integrally formed with or welded to the upper frame of the box blade section 1200. The storage housing 1400 includes a base wall 1420, rear wall 1440, front wall 1460, and opposing sidewalls 1480 defining an internal volume. In the illustrated embodiment, the storage housing comprises a generally rectangular shape. Dividing walls 1500 partition the interior into multiple storage compartments 1520 configured to receive equipment, such as fuel cans, bar oil, chains, or hand tools. The dividing walls 1500 may be fixed or removable to accommodate different load sizes and configurations. In some embodiments, the base wall 1420 includes drain apertures for liquid discharge.

In the illustrated embodiment, the front wall 1460 partially encloses the front end of the storage housing 1400 and comprises a slot in its upper portion to define a channel 1170 extending between an open upper end and the base wall 1420. The channel 1170 is configured to receive the blade portion of a chainsaw or other elongated tool therethrough, such that the tool may be stored in a vertical downward-facing orientation. The channel 1170 may be lined with a protective sleeve or insert in alternative embodiments to prevent wear on cutting implements.

In the illustrated embodiment, a fixed hitch mount 1600 is secured to the upper rear center portion of the assembly 1000 and supports a hitch ball 1620. The hitch mount 1600 is rigidly affixed to the frame of the box blade and does not articulate or translate relative to the assembly. However, the tractor's three-point hitch system, which operably connects to the assembly 1000, allows the entire assembly 1000 to be raised or lowered through hydraulic actuation. As a result, the vertical position of the hitch ball 1620 relative to the ground changes when the tractor's hydraulic lift arms are extended or retracted. This provides a functional towing height adjustment capability without requiring any movement within the hitch mount itself. When the box blade is elevated, the hitch ball 1620 correspondingly rises, increasing the trailer tongue angle, whereas lowering the implement reduces the trailer tongue height. This controlled adjustment enables an operator to tilt or level an attached trailer for improved loading and unloading of materials, such as gravel, soil, or cut wood, while maintaining the implement in a fully connected state.

In the illustrated embodiment, a pair of upright utility posts 1700 are mounted at opposing ends of the assembly 1000. In the illustrated embodiment, the posts 1700 are secured to the rear wall of the storage housing 1400. However, in alternate embodiments, the posts 1700 extend directly from the box blade body 1100. Each post 1700 includes fastening loops or hooks 1720 for securing items such as buckets, safety cones, or elongated tools. The posts may be removable or fixed, depending on user preference. The positioning of the posts 1700 also allow for supporting elongated tools between the opposing fasteners 1720, such as rakes, shovels, pry bars, or trimmers. In alternative embodiments, the posts 1700 may include secondary fasteners 1730 disposed on different sides thereof for carrying additional tools or accessories. These external holders increase the tool-carrying capacity of the assembly 1000 while preserving the internal compartments for smaller equipment or fuel containers.

in some embodiments, the integrated box blade storage and utility assembly 1000 further includes an auxiliary post 1740 extending upwardly from one of the scarifier shanks 126 or its associated mounting bracket. The auxiliary post 1740 is fixed in position relative to the scarifier frame and extends vertically to provide an additional external support structure configured for temporary retention of accessories such as safety cones, small buckets, or other elongated field implements. In one embodiment, the post 1740 comprises a cylindrical or square tubular member welded or bolted directly to the upper end of the scarifier support plate, thereby forming a rigid and vibration-resistant extension. The post may include a retaining lip, detent, or threaded cap at its distal end to prevent accidental displacement of stored items during tractor movement. This configuration allows operators to conveniently transport safety or marking cones used to delineate work areas or roadside operations, ensuring quick deployment without occupying space within the main storage housing. The integration of the auxiliary post with an existing scarifier element provides a simple, low-cost enhancement that maximizes use of structural components already present on the implement, minimizing manufacturing complexity while increasing functional versatility in the field.

Figure 3:
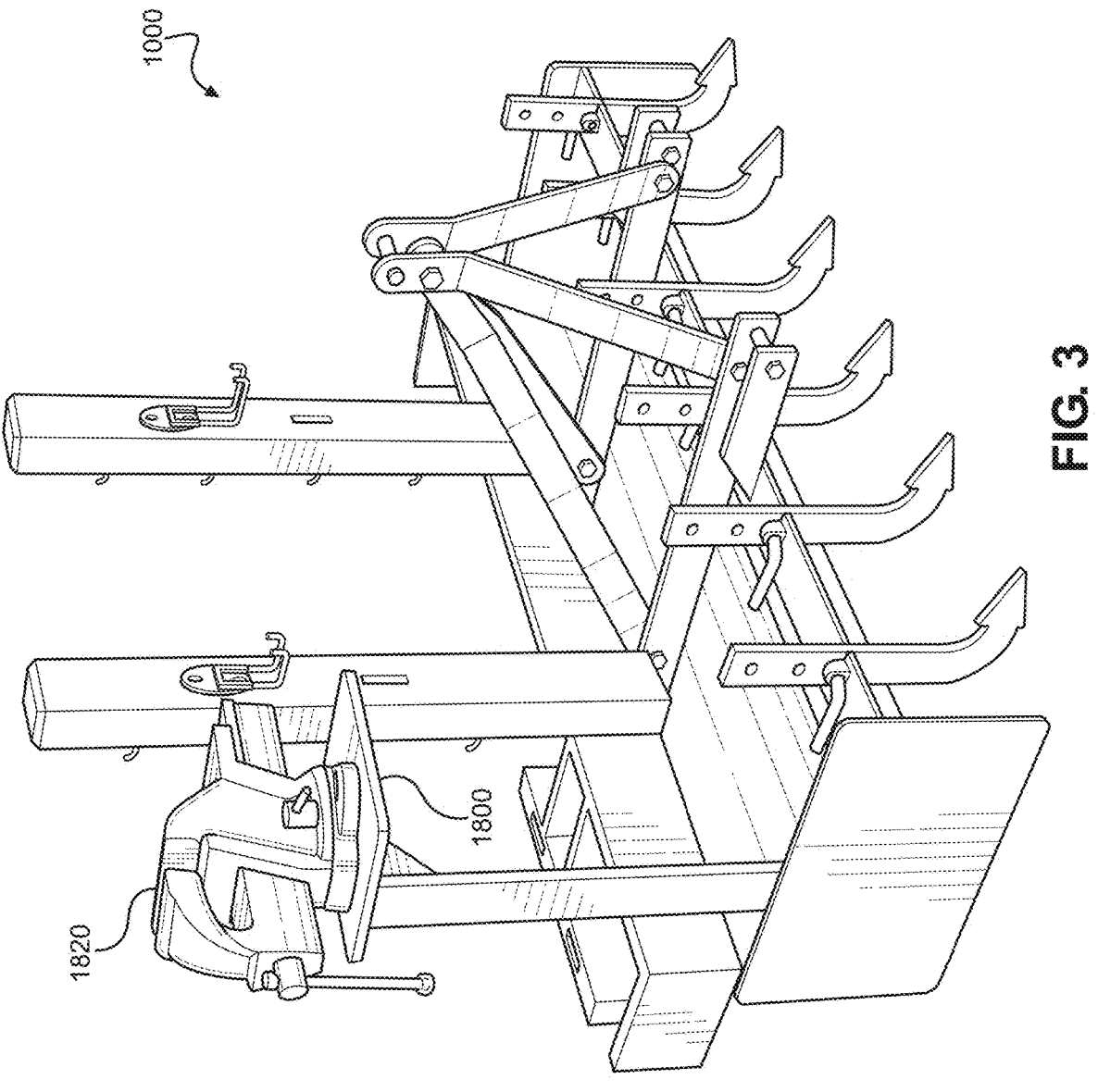
FIG. 3 shows a rear perspective view of an alternate embodiment of the integrated box blade storage and utility assembly.

Referring now to FIG. 3, there is shown a rear perspective view of an alternate embodiment of the integrated box blade storage and utility assembly. In the illustrated embodiment, on one lateral side of the assembly 1000, a tool shelf 1800 extends outwardly from the upper side region of the storage housing portion of the assembly. The shelf 1800 includes a vertically oriented support member secured to the sidewall of the housing, the support member extending downward to transfer operational loads directly into the frame of the box blade. The support member terminates at its upper end in a horizontal platform forming a rigid work surface. The platform may be constructed of a flat steel plate, reinforced composite, or similar rigid material capable of supporting the weight of hand tools and a mounted vise during field maintenance operations. The interface between the vertical member and the platform is welded, bolted, or integrally formed to ensure torsional stability and resistance to vibration.

In some embodiments, a vise 1820 is permanently affixed to the platform 1804, positioned near the outermost edge to maximize workspace and accessibility. The vise 1820 is configured to clamp a chainsaw bar or similar tool securely during sharpening, fueling, or repair procedures. In certain embodiments, the platform may include drainage openings, anti-slip surfacing, or a raised edge to prevent tools or fluids from sliding off during use. The combined structure of the vertical support member and horizontal platform provides a cantilevered but highly stable work shelf that is ergonomically positioned at approximately waist height, allowing the operator to service equipment comfortably while standing adjacent the tractor. The orientation and placement of the shelf are chosen such that it does not obstruct the operator's rearward line of sight or interfere with grading or towing operations. The design of the shelf 1800 thus provides an integrated, field-ready service station built directly into the box blade assembly, enabling efficient on-site maintenance without the need for auxiliary supports or detached work surfaces.

The integrated box blade storage and utility assembly 1000 is constructed of steel, aluminum, or other heavy-duty material suitable for field use. Its mass provides inherent ballast, thereby eliminating the need for a separate ballast box. The compact, all-in-one design increases efficiency, reduces attachment changes, and enhances safety by maintaining all essential tools and accessories within immediate reach. However, in some embodiments, the storage housing may further comprise a ballast chamber. This chamber may be selectively filled with sand, gravel, or other dense material to act as a counterweight, thereby enhancing tractor stability when lifting heavy front-end loads. This feature eliminates the need for a separate ballast box, combining storage and weight support in a single unit.

Figure 4:
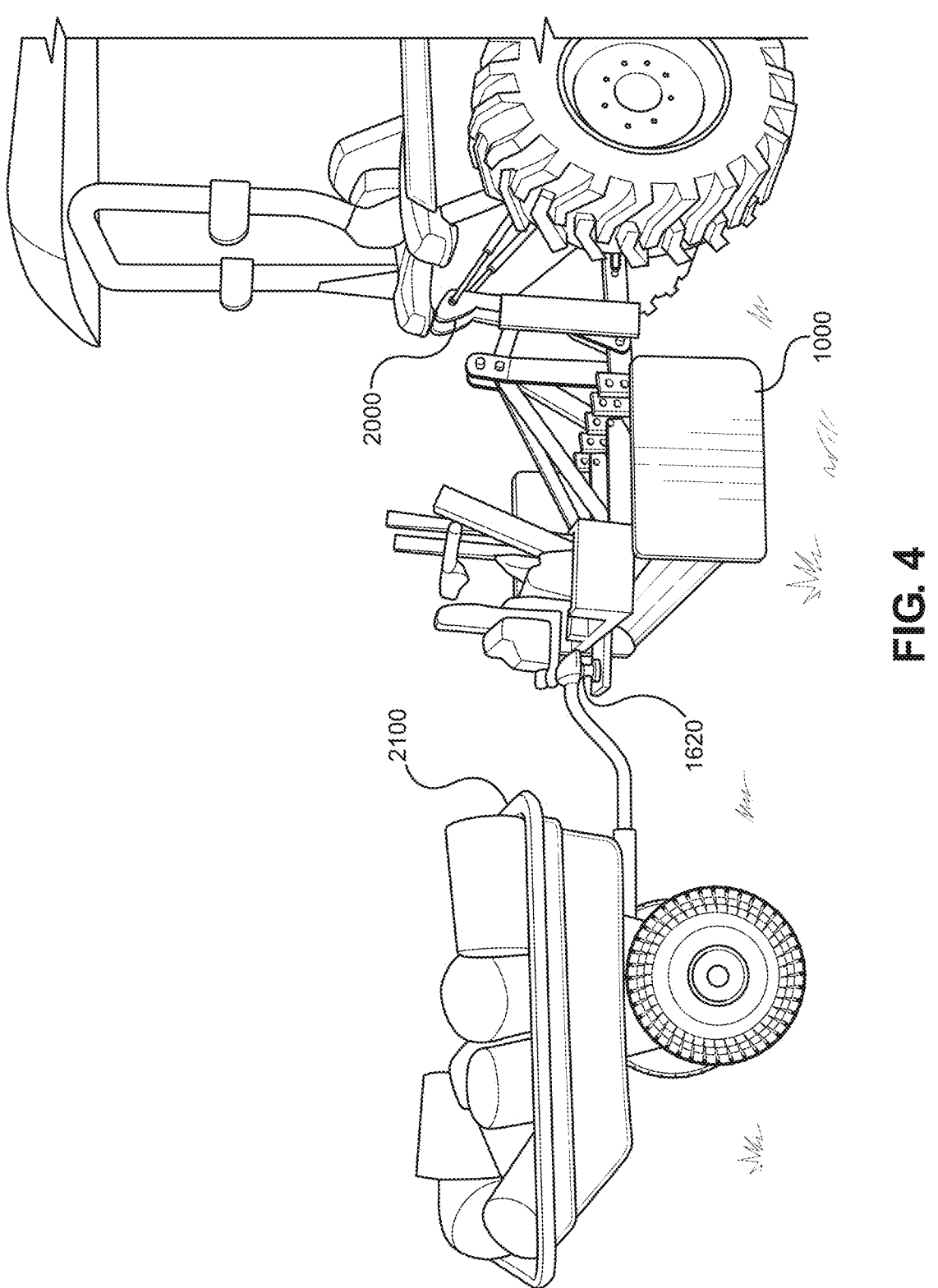
FIG. 4 shows a side perspective view of an embodiment of the integrated box blade storage and utility assembly connected to a tractor and tow cart.

Referring now to FIG. 4, there is shown a side perspective view of an embodiment of the integrated box blade storage and utility assembly connected to a tractor and tow cart. In operation, the assembly 1000 functions as a multi-purpose implement capable of performing grading, towing, storage, and field maintenance operations simultaneously. During grading or leveling operations, the box blade section of the assembly engages the ground surface, with the tractor's hydraulic lift arms 2000 controlling the depth and angle of the cutting edge to achieve the desired terrain contour. The integrated storage compartments remain fixed above the blade section, providing secure containment for tools, fluids, and accessories without interfering with the implement's balance or grading performance.

When towing a trailer or cart 2100, the fixed hitch mount 1600 and 2-inch hitch ball 1620 located at the rear of the assembly 1000 provide a robust and stable towing interface. As the tractor's hydraulic lift system raises or lowers the box blade assembly, the vertical position of the hitch ball 1620 relative to the ground correspondingly changes, thereby adjusting the pitch angle of the attached trailer 2100. This hydraulic elevation control enables the operator to tilt the trailer bed forward or backward for efficient loading and unloading of materials, such as firewood, aggregate, or equipment, without requiring manual repositioning of the trailer tongue. The integrated alignment of the hitch ball along the centerline of the implement ensures balanced load distribution, reducing torsional stress on the hitch arms and improving overall towing stability.

In field applications such as forestry or property maintenance, the operator can carry all necessary implements within the integrated storage compartments, refuel a chainsaw using fuel stored in the housing, and perform on-site sharpening or repairs using the fixed vise mounted on the side shelf. The placement of the vise at waist height allows safe and ergonomic maintenance, supported by the stable weight of the box blade assembly and the tractor's stationary posture. This arrangement eliminates the need to detach the implement or return to a workshop location, thereby enhancing productivity and reducing downtime. The integrated box blade storage and utility assembly 1000 thus consolidates multiple functional systems, such as grading, towing, storage, and servicing, into a single implement that remains attached to the tractor throughout the entire operational cycle.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An integrated box blade storage and utility assembly comprising, a unitary body having a first side and an opposing second side;

a box blade section extending from the unitary body and comprising a cutting edge, one or more side plates, and a plurality of scarifier shanks;

a storage section extending from the unitary body and fixed to and supported by the box blade section, the storage section comprising a housing having a base wall and a rear wall;

wherein the housing further comprises a pair of opposing sidewalls extending upward from the base wall and forming lateral boundaries of the storage section;

a plurality of dividing walls extending from the base wall and the rear wall between the pair of opposing sidewalls and defining a plurality of internal compartments;

wherein the storage section is open along a front side and open along a top side;

a front panel extending between and connected to distal ends of a pair of dividing walls of the plurality of dividing walls, the front panel having a height substantially similar to a height of the pair of opposing sidewalls, wherein the front panel partially encloses a front side of a pair of internal compartments of the plurality of internal compartments;

wherein the storage section extends laterally beyond a periphery of the box blade section;

a three-point hitch disposed on the first side of the unitary body and configured to attach the assembly to a tractor;

a towing hitch disposed on the opposing second side of the unitary body and configured to secure a towable implement; and wherein the towing hitch is fixed relative to the unitary body wherein raising or lowering the assembly via the three-point hitch correspondingly raises or lowers the towing hitch relative to the ground, respectively.

2. The assembly of claim 1, wherein the storage section is configured to provide ballast weight to stabilize a tractor during operation.

3. The assembly of claim 1, further comprising a pair of utility posts, wherein each utility post includes a first fastener for securing tools or accessories, the pair of utility posts extending upward from the rear wall and between the pair of opposing sidewalls of the housing.

4. The assembly of claim 1, wherein the plurality of dividing walls are removably disposed within the plurality of internal compartments.

5. The assembly of claim 1, further comprising a side-mounted shelf extending from the unitary body, the side-mounted shelf extending outward from a sidewall of the pair of sidewalls of the housing.

6. The assembly of claim 5, wherein the shelf comprises a vise permanently affixed thereto.

7. The assembly of claim 1, wherein the unitary body is formed of metal or reinforced polymer to withstand field vibration and impact during grading operations.

8. The assembly of claim 1, wherein the box blade section and storage section are integrally fabricated or welded together to form a continuous frame.

9. The assembly of claim 1, wherein the storage section is mounted above the box blade section with an upper rim positioned at a height permitting an operator standing at ground level behind the tractor to access the internal compartments.

10. The assembly of claim 3, wherein the first fasteners are configured to support an elongated tool therebetween, wherein the elongated tool is configured to be positioned parallel to the base panel of the storage container.

11. The assembly of claim 10, wherein the pair of posts further comprises a secondary fastener disposed on a different lateral face of the post than the first fastener.

12. The assembly of claim 1, wherein a channel is formed through an upper portion of the front panel and configured to receive a portion of a tool therethrough.

13. The assembly of claim 12, wherein the tool is a chainsaw, wherein the channel is configured to receive a blade of the chainsaw therethrough and support the chainsaw in a downward facing position.

14. The assembly of claim 1, wherein the towing hitch is configured to adjust a pitch angle of an attached trailer by raising or lowering the assembly while the trailer remains coupled to the towing hitch.

15. The assembly of claim 1, wherein at least one internal compartment of the plurality of compartments comprises a front wall, the front wall having a shorter height than a height of the pair of opposing sidewalls.

* * * * *